US006204813B1

(12) United States Patent
Wadell et al.

(10) Patent No.: US 6,204,813 B1
(45) Date of Patent: Mar. 20, 2001

(54) LOCAL AREA MULTIPLE OBJECT TRACKING SYSTEM

(75) Inventors: Brian C. Wadell, Reading; Robert J. McCarthy, Everett; Eric L. Gravengaard, Boston; Eric Spitz, Cambridge; Vahe Katros, Boston, all of MA (US)

(73) Assignee: Trakus, Inc., Medford, MA (US)

( * ) Notice: Subject to any disclaimer, the term of this patent is extended or adjusted under 35 U.S.C. 154(b) by 0 days.

(21) Appl. No.: 09/027,430

(22) Filed: Feb. 20, 1998

(51) Int. Cl.$^7$ ................................................. G01S 3/02
(52) U.S. Cl. ........................................... 342/463; 375/200
(58) Field of Search ................................ 342/463; 375/200

(56) References Cited

U.S. PATENT DOCUMENTS

| | | | |
|---|---|---|---|
| 3,659,085 | 4/1972 | Potter et al. | 235/150.2 |
| 4,110,726 | 8/1978 | Dorrance et al. | 340/6 R |
| 4,229,737 | 10/1980 | Heldwein et al. | 343/6 R |
| 4,304,404 | 12/1981 | Pundt | 273/85 G |
| 4,447,546 | 5/1984 | Hirschfeld | 436/527 |
| 4,542,987 | 9/1985 | Hirschfeld | 356/44 |
| 4,660,039 | 4/1987 | Barricks et al. | 342/27 |
| 4,665,404 | 5/1987 | Christy et al. | 342/463 |
| 4,924,188 | 5/1990 | Akazawa et al. | 328/155 |
| 4,933,952 | 6/1990 | Albrieux et al. | 375/1 |
| 4,951,214 | 8/1990 | Hollister | 364/460 |
| 4,955,000 | 9/1990 | Nastrom | 367/117 |
| 5,039,977 | 8/1991 | Mele et al. | 340/323 R |
| 5,056,106 | 10/1991 | Wang et al. | 375/1 |
| 5,184,135 | 2/1993 | Paradise | 342/149 |
| 5,365,516 | 11/1994 | Jandrell | 370/18 |
| 5,438,321 | 8/1995 | Bernard et al. | 340/573 |
| 5,438,518 | 8/1995 | Bianco et al. | 364/460 |
| 5,450,070 | 9/1995 | Massar et al. | 340/825.35 |
| 5,458,123 | 10/1995 | Unger | 128/696 |
| 5,461,387 | 10/1995 | Weaver | 342/357 |
| 5,477,459 | 12/1995 | Clegg et al. | 364/460 |
| 5,485,163 | 1/1996 | Singer et al. | 342/457 |
| 5,488,662 | 1/1996 | Fox et al. | 380/34 |
| 5,502,445 | 3/1996 | Dingwall et al. | 342/51 |
| 5,513,384 | 4/1996 | Brennan et al. | 455/180.1 |
| 5,513,854 | 5/1996 | Daver | 273/454 |
| 5,534,876 | 7/1996 | Erickson et al. | 342/387 |
| 5,553,126 | * 9/1996 | Tang | 379/185 |
| 5,579,001 | 11/1996 | Dempsey et al. | 340/870.01 |
| 5,581,257 | 12/1996 | Greene et al. | 342/51 |
| 5,583,517 | 12/1996 | Yokev et al. | 342/457 |
| 5,600,706 | 2/1997 | Dunn et al. | 379/59 |
| 5,912,644 | * 6/1999 | Wang | 342/457 |
| 5,926,133 | * 7/1999 | Green, Jr. | 342/363 |
| 5,926,501 | * 7/1999 | Souissi et al. | 375/200 |

FOREIGN PATENT DOCUMENTS

| | | | |
|---|---|---|---|
| 2710434 | 3/1995 | (FR) | G06T/7/20 |
| 2726370 | 5/1996 | (FR) | G01S/5/00 |
| WO 96/16700 | 6/1996 | (WO) . | |

OTHER PUBLICATIONS

PCT Search Report dated Jul. 6, 1998 from corresponding PCT Application No. PCT/US98/03866.
K. Maney, USA Today ,"Sports TV Hits High–Tech Heights" Mar. 12, 1998, p. 4B.

* cited by examiner

Primary Examiner—Theodore M. Blum
(74) Attorney, Agent, or Firm—Testa, Hurwitz & Thibeault, LLP

(57) ABSTRACT

A radio frequency positioning system is described that determines identity and positional data of numerous objects. The system includes a plurality of spread spectrum radio transceivers where at least one transceiver is positioned on each of the numerous objects. At least three spread spectrum radio transceivers transmit to and receive signals from the plurality of radio transceivers. A signal processor is coupled to the spread spectrum radio transceivers and determines the identity and the positional data of the objects.

28 Claims, 5 Drawing Sheets

LOCAL AREA MULTIPLE OBJECT TRACKING SYSTEM

FIELD OF THE INVENTION

The invention relates generally to the field of tracking systems. In particular, the invention relates to a local area tracking system for tracking multiple objects.

BACKGROUND OF THE INVENTION

Prior art object tracking systems are known in the art. Many prior art tracking systems use the Global Positioning System (GPS) to determine the three-dimensional position and velocity of an object. GPS is a network of 24 satellites and a dozen ground stations. Signals from four or more satellites are used to obtain the three-dimensional position and velocity of the object. GPS generally has a 100 meter ranging error for civil users and a 15 meter ranging error for military users, but these errors can be reduced by sophisticated error correction algorithms.

U.S. Pat. No. 5,438,518 describes a player positioning and distance finding system that uses GPS. The system includes a mobile interface unit that has a memory element, position interface electronics, a data processor, and a player interface. The memory element stores digitized map representations of playing fields. The position interface electronics receives position indicative signals that are representative of a geographical location of the mobile unit from the GPS. The data processor couples to the memory element and to the position interface electronics and correlates the geographical location to a field location of the mobile interface unit on the playing field. The processor also determines the distance from the mobile interface unit to a first landmark. The player interface is coupled to the data processor and communicates the distance between the mobile interface unit and the first landmark to the player.

Other tracking systems use a localized RF system. For example, U.S. Pat. No. 5,513,854 describes a process and a hardware system that allows real time automatic acquisition of a multitude of parameters which describe the physical activity of the athletes as well as a graphical representation of the parameters. Real time acquisition of the instantaneous position of every person on a game field is accomplished by use of a miniaturized radio frequency transmitter carried by the person and a set of at least three radio frequency goniometric receivers which determine the direction from which the transmitters transmit. A digital processor uses triangulation methods to determine the position of the transmitters.

U.S. Pat. No. 4,660,039 describes another tracking system that uses a localized RF system. This patent is directed to a system for locating a sport object. The user carries a radio frequency transmitter, and the sport object has a conductive stripe. The conductive strip has an effective length of one-quarter wavelengths at the signal frequency so that it increases the load on the transmitter as it moves closer to the sport object.

Several other RF tracking systems use coding techniques to identify the objects being tracked. For example, U.S. Pat. No. 5,056,106 describes a golf course ranging and direction-finding system that uses spread-spectrum radio location techniques. The system employs a spread-spectrum based radio location system to determine distance and direction between a golfer and key locations on a golf course. A plurality of timing reference transmitters are located throughout the vicinity of the golf course. The transmitters broadcast a spread-spectrum ranging signal consisting of a radio-frequency carrier directly modulated by a periodic pseudo-noise (PN) coded or similar sequence. Each transmitter broadcasts at the same RF signal but a unique PN-coded sequence is assigned to each transmitter. Golfers are provided with the hand-held receiving unit which receives the transmitter spread-spectrum signals and which synchronizes to the spread-spectrum signals in order to obtain range estimates to a selected set of reference transmitters.

U.S. Pat. No. 5,438,321 is directed to a location system for tracking miners underground. The system includes a number of identification stations connected to a central control station. Miners are issued portable identification modules which are fitted to their caplamps and are powered by their battery packs. The identification modules transmit unique identification signals that are received by the identification stations.

U.S. Pat. No. 5,450,070 is directed to an electronic missing file locator system that includes a transmitter to selectively transmit packets of radio frequency cycles indicative of the coded address of a particular folder. A transponder is attached to the folder and receives the transmission and responds thereto by producing an audible sound which enables the field to be easily located.

U.S. Pat. No. 5,458,123 is directed to a system for monitoring patient location and data. The system includes a transmitter associated with each patient that includes sensors operative to monitor vital signs of the patient. The transmitter transmits an allocated RF frequency which is particularly associated with that patient. A series of antennas are incorporated in a building, each antenna having its own signature signal. As the patient moves throughout the building, the antennas pick up the signals from the patient's transmitter and combines the antenna signature signal with the transmitted patient signal. This combined signal is then analyzed at a central location to determine the exact location of the patient due to the antenna signature signal which is modulated on the transmitted patient signal. Transmitted patient data is also decoded at the central station to provide a signal indicative of the vital signs of the patient.

U.S. Pat. No. 5,581,257 is directed to a radio frequency automatic identification system that detects targets. The system includes a plurality of radio frequency resonators. Information is attributed to the target in accordance with the radio frequency response characteristics of the target, such as the resonant frequencies of resonators present, and/or the spatial locations within the target of the resonators. Readers for use in the system read the radio frequency response characteristics of a target in the near field of a radiating aperture which is illuminated by a radio frequency source. Items which may be encoded with radio frequency readable information include documents, credit cards, and computer diskettes.

U.S. Pat. No. 5,583,517 is directed to a multi-path resistant frequency-hopped spread spectrum mobile location system. The frequency-hopped spread spectrum mobile vehicle or person location system consists of a central station, a plurality of base stations and a plurality of mobile transmitters which transmit using a frequency-hopped spread-spectrum differential bi-phase shift keying communication signal. Each of the plurality of base stations includes an array of receiving dipole antennas and employs a special algorithms for retrieving very low power frequency-hopped spread spectrum signals in a noisy and multi-path environment. The base stations use computational algorithms for determining the phase difference between each of the receiving dipole antennas to determine the direction of the transmitter relative to the location of the respective base station. The multiple directions of arrival angles of the received signal at each base station are corrected based on an n-dimensional ambiguity space to locate the most probable angles of arrival.

The prior art local area tracking systems have several limitations. For example, GPS based systems can not easily obtain centimeter accuracy. Also, GPS systems cannot be used indoors and may not work in urban or canyon environments. GPS and other prior art tracking systems have relatively slow update rates and, therefore, are not suitable for video application. Many prior art tracking systems require one or more highly precise clocks that are expensive and physically large. Also, many prior art tracking systems are not scaleable. In addition, prior art tracking systems do not employ transceivers capable of receiving instructions to transmit certain data at certain times.

SUMMARY OF THE INVENTION

It is therefore a principal object of this invention to determine the position of multiple objects, in a local area such as an indoor playing field, with centimeter resolution without the use of precision clocks. It is another principal object of this invention to employ transceivers proximate to the objects being tracked that are capable of receiving instructions to transmit certain data at certain times. It is yet another principal object of this invention to employ spread spectrum coding to locate objects being tracked. It is yet another principal object of this invention to provide a scaleable tracking system that allows for additions and deletions of objects during real time tracking. It is yet another principal object of this invention to provide a tracking system that includes software that corrects for unsynchronized clocks in the tracking system hardware.

Accordingly, the present invention features a radio frequency (RF) positioning system that determines the identity and positional data such as location, velocity, and acceleration of numerous objects. The system includes a plurality of spread spectrum radio transceivers where at least one transceiver is positioned on each object. Using spread spectrum radio transceivers is advantageous because it allows unlicensed operation.

At least three spread spectrum radio transceivers transmit to and receive signals from the plurality of radio transceivers. The at least three spread spectrum radio transceivers may employ directional antennas. Also, a processor may be electrically coupled to the at least three spread spectrum radio transceivers. The processor determines the time of arrival of signals received by the spread spectrum radio transceivers.

A signal processor is coupled to the spread spectrum radio transceivers. The signal processor determines the identity and positional data of the objects. The signal processor may determine at least one of: position; time derivatives of position; orientation; and time derivatives of orientation. The signal processor may be connected to the spread spectrum radio transceivers by any network, such as an Ethernet, fiber optic or wireless network.

A memory may be used to store the identity and the positional data of the objects. A video processor may be used to display the identity and the positional data of the objects on a video display terminal. In addition, the RF positioning system may include a database engine for storing and retrieving data relating to the objects. The data may include biographical data of players in a game such as physical characteristics (height, weight, and strength and speed metrics) and previous game statistics. The video processor can display the data relating to the objects separately or together with the identity and the positional data of the objects.

The present invention also features a method of determining identity and positional data of numerous objects in a three-dimensional space. The method includes providing a plurality of spread spectrum radio transceivers where at least one transceiver is positioned on each of the numerous objects. The method also includes providing at least three spread spectrum radio transceivers. The method may include instructing the spread spectrum radio transceivers to transmit a spread spectrum signal that instructs a particular one of the plurality of spread spectrum radio transceivers to transmit a signal that can be processed to determine identity and positional data of the transceivers.

Signals are received from at least one of the spread spectrum radio transceivers with the spread spectrum radio transceivers. A signal processor is provided that is coupled to the spread spectrum radio transceivers. The signal processor despreads the signals to determine the identity of the objects and processes the signals to determine the positional data of the objects. The positional data may be at least one of: position; time derivatives of position; orientation; and time derivatives of orientation. The positional data of the objects may be determined from estimates of the times of arrival of the signals to each of the at least three antennas. The times of arrival may be measured relative to a synchronization clock.

The method may include storing the identity and the positional data of the objects. The method may also include displaying the identity and positional data relating to the objects on a video screen. Information specific to the objects may also be displayed on the video screen.

The present invention also features a system for monitoring the performance of sports players on a sporting field. The system includes a plurality of spread spectrum radio transceivers where at least one transceiver is positioned on each of a plurality of sports players. The plurality of spread spectrum radio transceivers may be positioned proximate the sports player's center of mass. Sensors may be positioned on the sports players and electrically coupled to the transceivers. The sensors may comprise one or more motion sensors such as impact, acceleration, or gyro sensors. The sensors may also comprise one or more non-motion sensors such as physiological sensors.

At least three spread spectrum radio transceivers are positioned proximate to the sports field. The spread spectrum radio transceivers transmit to and receive signals from the plurality of radio transceivers. A signal processor is coupled to the spread spectrum radio transceivers. The signal processor determines the identity and the positional data of the sports players.

The positional data includes at least one of: position; time derivatives of position; orientation; and time derivatives of orientation of the players. The system may include a memory that stores data relating to the players including the identity and positional data of the players. The system may include a video processor that displays the data relating to the players on a video display. The system may also include a data processor for calculating player performance statistics and displaying the statistics on a video display terminal. The data relating to the players and the player performance statistics can be displayed separately or together with video of the players playing the game.

BRIEF DESCRIPTION OF THE DRAWINGS

This invention is described with particularity in the appended claims. The above and further advantages of this invention may be better understood by referring to the following description taken in conjunction with the accompanying drawings, in which:

DETAILED DESCRIPTION

Figure 1:
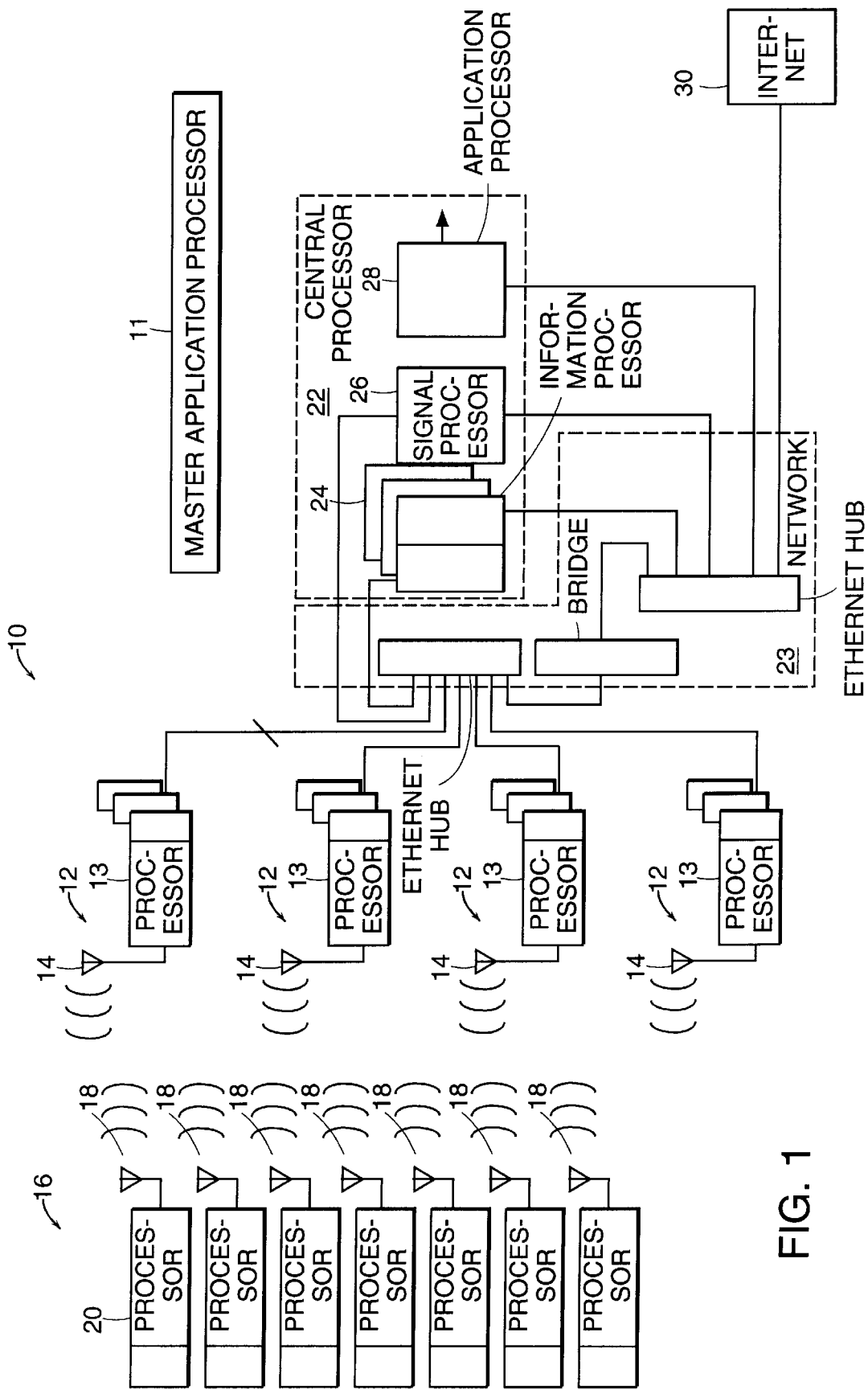
FIG. 1 is a block diagram of the local area multiple object tracking system embodying the invention.

FIG. 1 is a schematic diagram of the local area multiple object tracking system 10 embodying the invention. The system 10 tracks the three-dimensional positions of multiple objects simultaneously and determines location, velocity, and acceleration vectors. In one sample embodiment, the system 10 tracks football players during a football game.

The tracking system 10 may include a master application processor 11 that controls and monitors the system 10. The tracking system 10 includes at least three tower transceivers 12. Each of the tower transceivers 12 includes processors 13 and antennas 14. The tower transceivers 12 are located surrounding a local area such as a playing field. The tower transceivers 12 may be movable. Additional tower transceivers are used if objects become obscured as they move through the local area. Using additional tower transceivers improves accuracy and also extends battery life since lower transmitter powers can be used. In order to track objects in three dimensions, more than three tower transceivers 12 are typically used.

The antennas 14 transmit electromagnetic energy generated by the tower transceivers 12 to and receive electromagnetic energy from the objects being tracked. The antennas 14 are typically positioned around and above the local area and the objects being tracked. Such positioning is advantageous because it reduces signal interference caused by the objects being tracked. If three-dimensional positional data is required, the antennas 14 may be positioned in at least two different planes.

The antennas 14 may be directional antennas. In one embodiment, the antennas 14 may be directional with $\geq 90°$ azimuth and $-90°$ to $0°$ range elevation coverage. Using directional antennas is advantageous because the directionality improves signal rejection of multi-path signals. The antennas may be mechanically or electronically rotatable. Additional position information or directionality can be obtained by steering the antenna's main lobe. The antennas 14 may also be mobile. The position of the antennas may be known relative to a fixed object or may be located with another system such as GPS.

Object patch transceivers 16 are attached to each of the objects being tracked (not shown). Antennas 18 are electrically coupled to the object patch transceivers 16 for transmitting to and receiving signals from the tower transceivers 12. The antennas 18 may be hemispherical pattern antennas that are integrated into the object patches. For example, the antennas 18 may be microstrip line patch antennas that conform to surfaces such as a player's helmet. A processor 20 is coupled to each of the object patch transceivers 16 for processing the received signal. The object patches 16 may be remotely reconfigurable. For example, the object patch's code and code length may be remotely programmable. The object patches may also incorporate remote testing capability.

Each of the tower transceivers 12 are coupled to a central processor 22 by a network 23. The network 23 may be any high-speed communication network such as a wireless link or Ethernet. The central processor 22 includes an information processor 24, a signal processor 26, and an application processor 28. The central processor 22 may include a database engine for storing and retrieving data about the objects being tracked. For example, the data may represent past movements or statistical data about the object being tracked. This data may be accessed by a video processing system such as a Chyron system and converted into high quality graphic images. The video processing system can display the data separately or together with video of the objects. The central processor 16 may employ algorithms to create animation or graphs. The data may also be made available to the internet 30 so that it can be distributed throughout the world.

In operation, the processors 13 in the tower transceivers 16 determine the times of arrival of the signal received from the object patches. From the times of arrival and from knowledge of the location of the tower transceivers 16, the central processor 22 determines the location, velocity, and acceleration (LVA) of the objects. In one embodiment, the tower transceivers 12 move along with the objects being tracked. In this embodiment, the position of the tower transceivers 12 along with the times of arrival are sent to the central processor 22 to determine the LVA of the objects. The central processor 22 generates numerical and graphical representations of LVA for each of the players.

The central processor 22 may also determine various performance metrics from the positional data and from sensor data transmitted by the object patches 16. In one embodiment, accelerometer and gyro data are also transmitted by the object patches. The central processor 22 may merge the LVA data with data in a database such as a sports specific database. Certain performance metrics such as a"hit gauge" may be calculated from the merged data.

Numerous techniques are used to separate the signals from each of the objects. In one embodiment, the object patches 16 are programmed with a time division multiple access (TDMA) time slot. In other embodiments, the object patches 16 are programmed with frequency division multiple access (FDMA), code division multiple access (CDMA), or spatial diversity multiple access (SDMA). Combinations of these techniques can also be used. In one embodiment, the object patch 16 and tower transceivers 12 transmit and receive 2.4 GHz carrier signals that are binary phase shift key (BPSK) modulated with a pseudo-random noise (PRN) code.

In one embodiment, the object patches 16 transmit their code during an assigned time slot using direct sequence (DS) spread spectrum. Using spread spectrum codes is advantageous because multiple objects can use the same time slot and because it allows unlicensed operation. Frequency diversity schemes may also be used in situations where a single frequency is not reliable enough. The tower transceivers 12 are programmed with a list of object identifications and their corresponding TDMA time slots. The tower transceivers 12 listen during the appropriate time slot for each of the objects and, if an object patch signal is detected, the processor 13 determines the object's identification code and measures the signal's time-of-arrival (TOA) to the tower transceivers 14.

Figure 2:
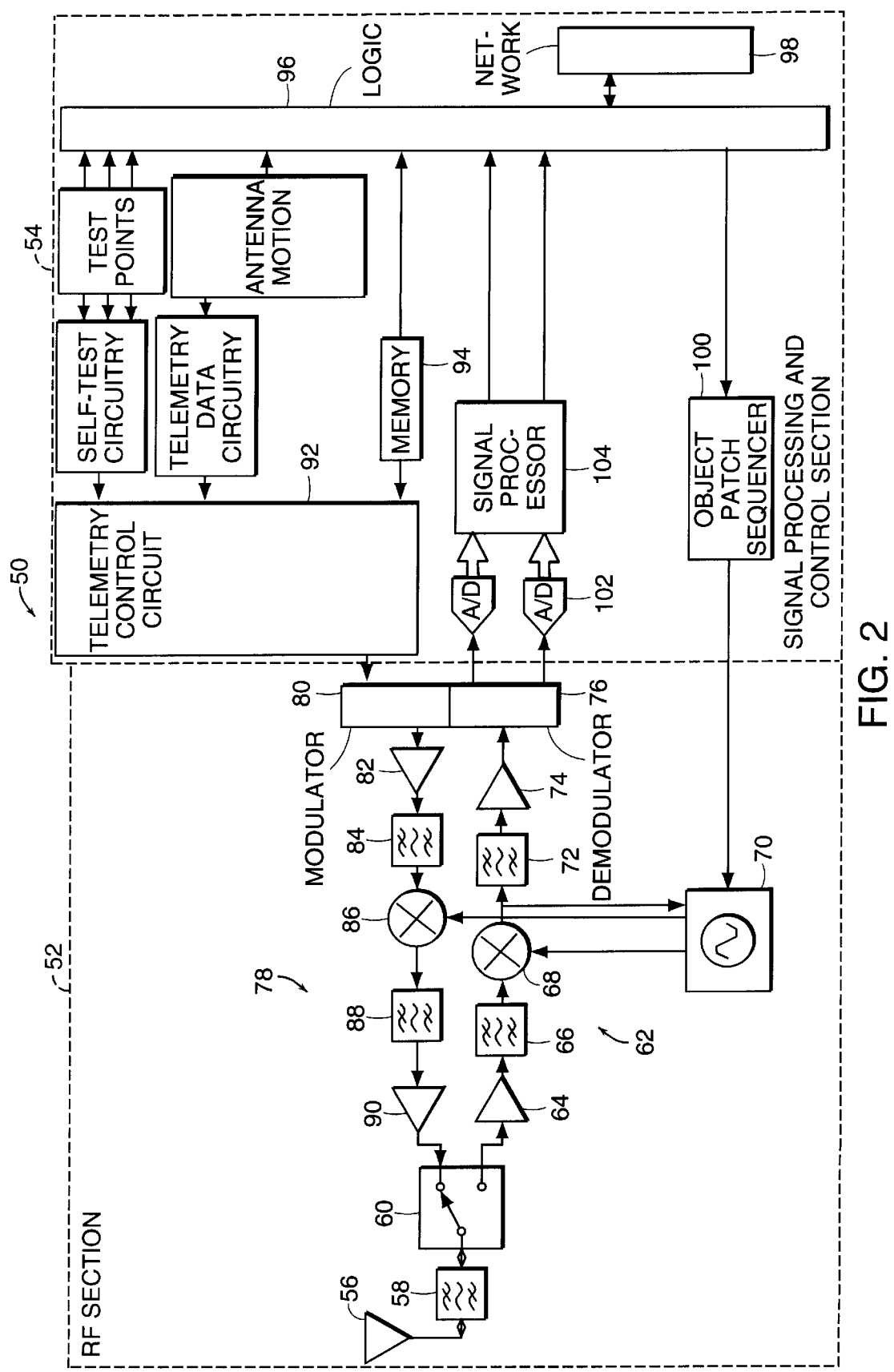
FIG. 2 illustrates a block diagram of the tower transceivers of FIG. 1.

FIG. 2 illustrates a block diagram of the tower transceivers of FIG. 1. The tower transceivers 50 generally comprise an RF section 52 and a signal processing and control section 54. The RF section 52 includes an antenna 56 that transmits and receives signals from the object patches 16 (FIG. 1). An RF bandpass filter 58 filters unwanted signals from nearby bands when receiving signals and filters unwanted signals such as harmonics signals from the carrier when transmitting.

In one embodiment, a switch 60 selects the transceiver transmit/receive chain. When the switch 60 selects the receive chain 62, a low noise amplifier 64 amplifies the signals received by the antenna 56 and filtered by RF bandpass filter 58 while adding only a minimal amount of noise. A receiver bandpass filter 66 removes undesired interfering signals such as image frequencies. A mixer 68 is used with a local oscillator 70 to down-convert the resulting filtered signal. In one embodiment, the signal is down-converted from 2.4 GHz to a lower intermediate frequency (IF) in the megahertz region.

The local oscillator 70 may be a digital synthesizer. The digital synthesizer may use numerous techniques known in the art such as Phase-Locked Loop (PLL), Direct Digital Synthesis (DDS), or Direct Synthesis. In one embodiment, the local oscillator 70 generates a microwave carrier at 2.44 GHz that is synchronous with or frequency locked to a lower frequency reference signal. To increase capacity, multiple transmission frequencies may be used. If multiple frequencies are used, the local oscillator 70 is tuned to convert the required frequency down to a fixed IF frequency.

The IF signal passes through a bandpass filter 72 that eliminates unwanted signals. The filtered IF signal then passes through an automatic gain control circuit 74 that limits the desired modulation signal level. A demodulator 76 converts the IF signal into a demodulated signal comprising in-phase (I) and quadrature (Q) data streams.

When the switch 60 selects the transmitter chain 78, the tower transceiver 50 generates and transmits a signal to each of the object patches 16 (FIG. 1) during assigned time slots. A modulator 80 generates a desired intermediate frequency (IF) signal. An automatic gain control circuit 82 is used to limit the IF signal level. A filter 84 removes undesired interfering signals from the IF signal. A mixer 86 is used with the local oscillator 70 to up-convert the resulting IF signal to the desired transmission signal. In one embodiment, the local oscillator 70 is a digital synthesizer as described above and the modulation signal is up-converted from the megahertz region to 2.4 GHz for transmission. A transmitter bandpass filter 88 may be used to remove undesirable signals introduced by the mixer 86. A power amplifier 90 amplifies the desired transmission signal to the appropriate level.

The signal processing and control section 52 includes a telemetry control circuit 92 that controls the modulator 80 on the transmitter chain 78. A non-volatile memory 94 such as an EEPROM stores modulation information such as identification codes, slot number, and self test history. The telemetry control circuit 92 is coupled to logic 96 that interfaces with a network 98. The signal processing and control section 52 also includes an object patch sequencer 100 that is coupled to the network 98 by the logic 96 and that controls the frequency of the synthesizer 100.

The signal processing and control section 52 also includes analog-to-digital converters 102 and a signal processor 104. The analog-to-digital converters 102 convert the demodulated signal comprising in-phase (I) and quadrature (Q) data streams into digital data streams. A signal processor 104 coupled to the analog-to-digital converters 102 matches the demodulated (IQ) signals to the identification code for the desired objects. The TOA in a local time system is calculated from the cross correlation or by using other time measurement circuitry in the signal processor 104. The TOA and other information such as sensor data may be merged with the object's identification code to create a Digital Signal Processing Record (DSPR). The DSPR is passed out onto the network 98 through the logic 96.

Figure 3:
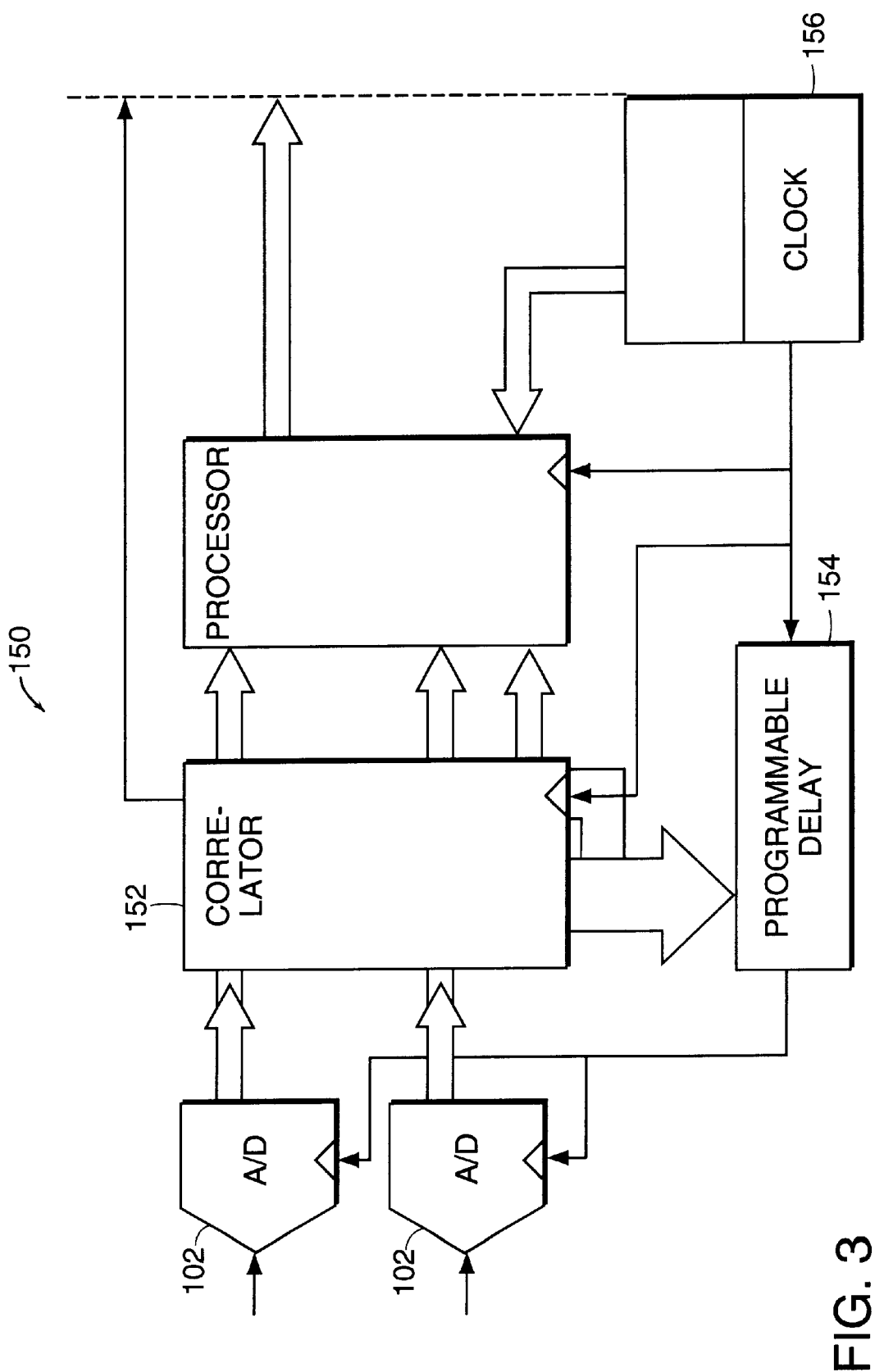
FIG. 3 illustrates a block diagram of a cross correlation circuit.

In one embodiment, the TOA estimates are calculated using a cross correlation circuit. FIG. 3 illustrates a block diagram of the cross correlation circuit 150. The analog-to-digital converters 102 in the processing and control section 52 of the tower transmitter 50 are used to convert the demodulated signal comprising in-phase (I) and quadrature (Q) data streams into digital data streams. A correlator 152 compares the digitized IQ data with an internally generated object identification code to determine the identity of the signal.

A precision programmable delay 154 controls the phase of a clock 156 driving the analog-to-digital converters 102 relative to the phase of the correlator 152 to achieve very fine time resolution. The programmable delay 154 may be implemented by numerous techniques known in the art such as direct digital or other synthesis of offset frequencies, delay locked loop, tapped delay line, and jittered clock. The cross correlation circuit 152 and the clock in combination should be designed to correct for any significant Doppler shift.

In one embodiment, the correlator 152 implements the following cross correlation algorithm:

$$R(\tau) = \int_{-\infty}^{+\infty} x_{pp}(t) x_{replica}(t+\tau) dt$$

where $x_{pp}(t)$ is the demodulated signal comprising in-phase (I) and quadrature (Q) data streams and $X_{replica}(t)$ is a replica of the desired PRN code. The results of the correlation are used to determine the TOA of the signal. Typically the maximum $R(\tau)$ is used to determine the TOA of the signal. Other algorithms can be applied to $R(\tau)$ to remove multipath or other signal impairments.

Figure 4:
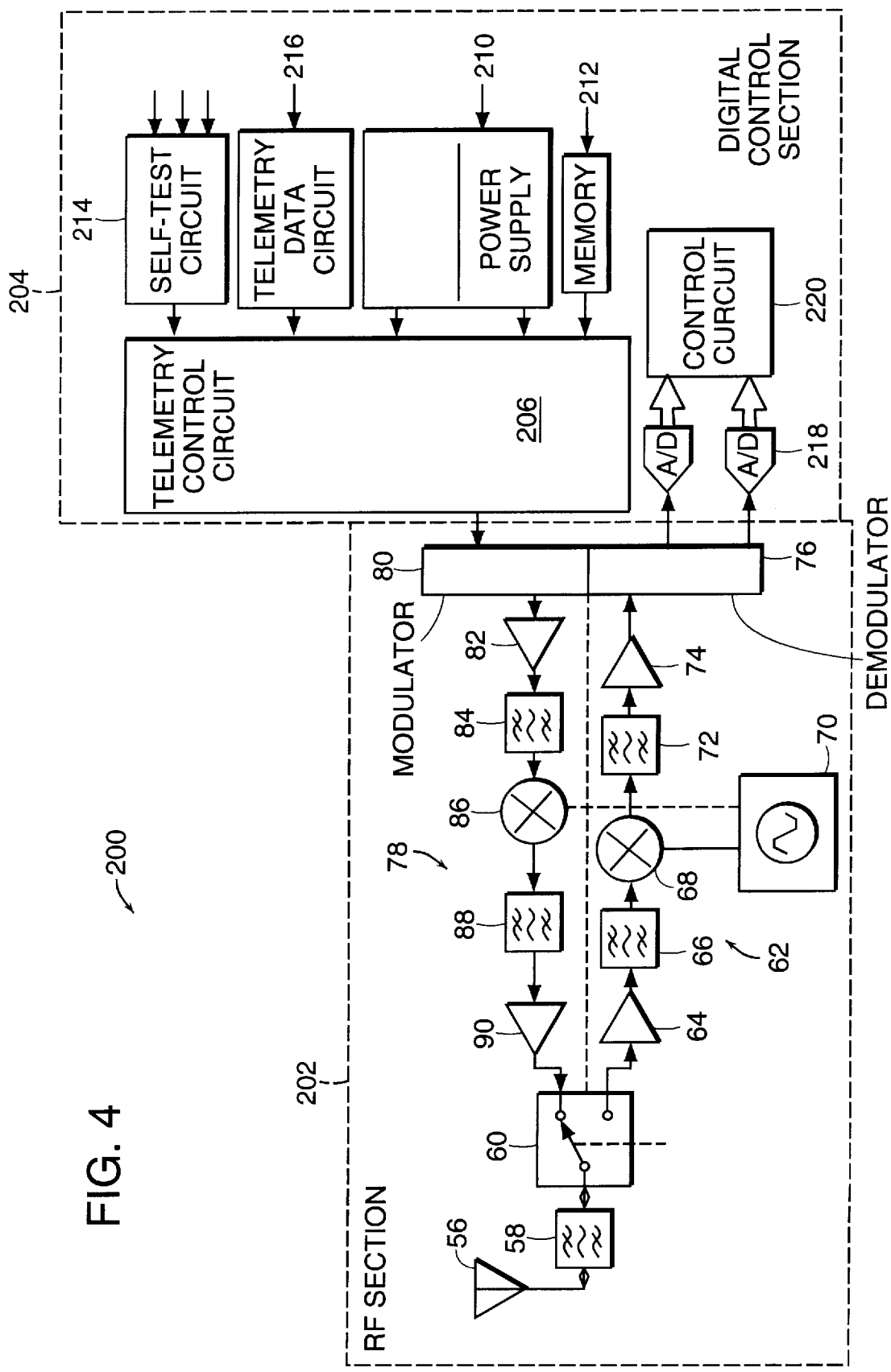
FIG. 4 illustrates a block diagram of the object patch of FIG. 1.

The TOA of a signal transmitted at $t_{start}$ and received at antenna m from object or player n can be calculated from the following algorithm:

synchronization of the at least three spread spectrum transceivers FIG. 4 illustrates a block diagram of the object patch of FIG. 1. The object patch 200 generally comprises an RF section 202 and a digital control section 204. The RF section 202 of the object patches 200 is functionally equivalent to the RF section 52 of the tower transceivers 50 as described above.

The digital control section 204 includes a telemetry control circuit 206 on the transmitter chain 78 that controls the modulator 80. A battery operated power supply 210 provides power to the object patch. A non-volatile memory 212 such as an EEPROM stores modulation information such as identification codes, slot number, and self test history. A self test circuit 214 is coupled to the telemetry control circuit 206 for testing the operation of the object patches 200 and for supplying data to be transmitted by the transmitter chain 78. A telemetry data circuit 216 is coupled to the telemetry control circuit 206 and provides data such as acceleration, battery voltage, temperature, and heart rate from various sensors attached to the object.

The digital control section 204 also includes analog-to-digital converters 218 and a control circuit 220 on the receiver chain 62 that converts the demodulated signal comprising in-phase (I) and quadrature (Q) data streams into digital data streams. The control circuit 218 extracts patch control information from the digital data steams.

Figure 5:
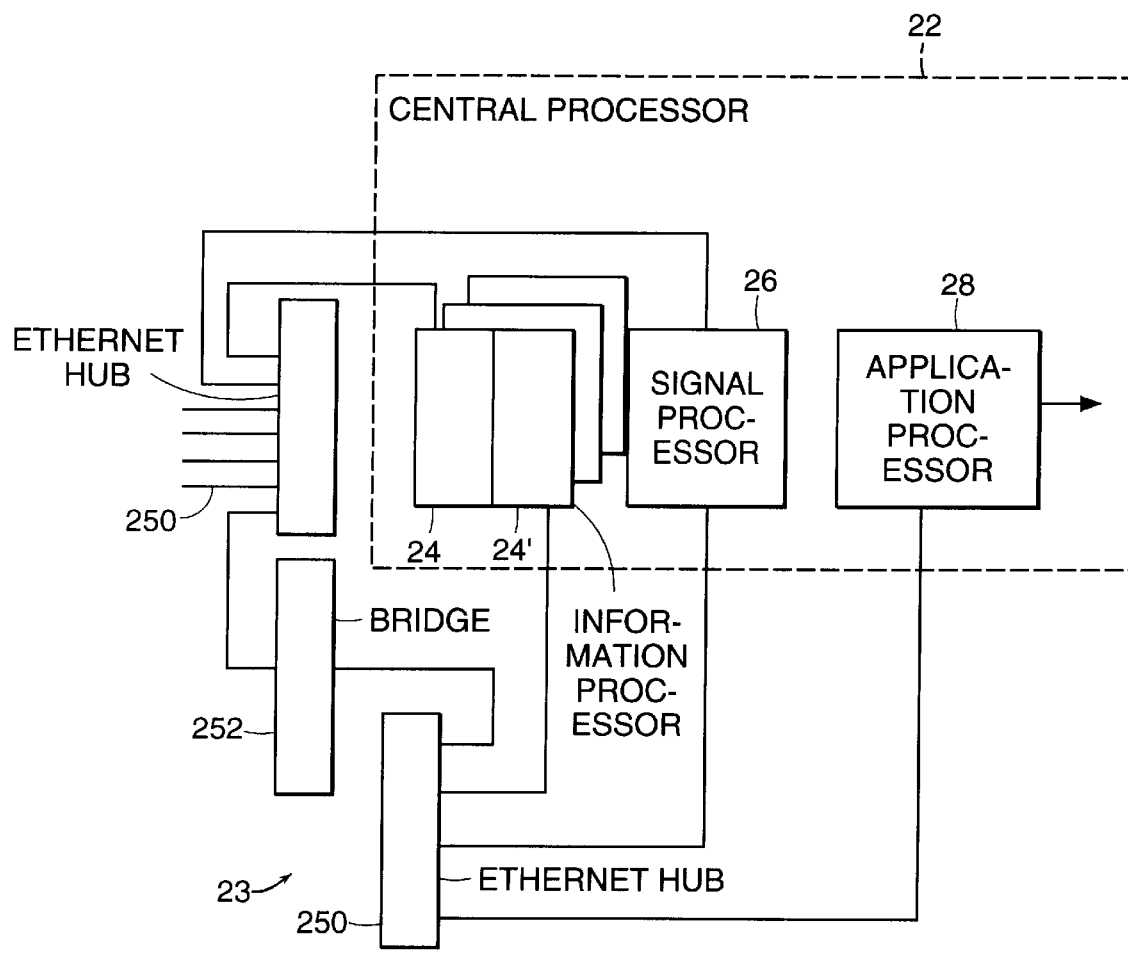
FIG. 5 illustrates a block diagram of the central processor of FIG. 1.

FIG. 5 illustrates a block diagram of the network 23 and central processor 22 of FIG. 1. In one embodiment, the network 23 includes an Ethernet hub 250 and bridge 252 that are used to create two separate networks that connect the $$TOA_{antenna\ m, player\ n} = t_{start} + \frac{\sqrt{(x_{antenna,m} - x_{playera,n})^2 + (y_{antenna,m} - y_{playera,n})^2 + (z_{antenna,m} - z_{playera,n})^2}}{c}$$

where the object's or players' positions are represented as x, y, and z coordinates and where c is the speed of light in air. The starting time, $t_{start}$ is not known accurately enough to compute TOA with the required accuracy. The time of arrival of the signals at each of the antennas can, however, be determined with a high degree of accuracy.

The difference in time of arrival from one antenna to another antenna (ΔTOA) can be accurately calculated using the following algorithm:

tower transceivers 12 to the central processor 22. The use of two separate networks balances the traffic more efficiently and provides redundancy.

In one embodiment, the central processor 22 includes an information processor 24 that determines the position information from the TOA estimates provided by the tower transceivers 12. The position of the objects or players in the local area is determined from the ΔTOA of at least three pairs of antennas by using the following algorithm:

$$\Delta TOA_{antenna\ j-k, player\ n} = (TOA_{antenna\ j, player\ n} - TOA_{antenna\ k, player\ n})$$

$$\Delta TOA_{antenna\ j-k, player\ n} = \frac{1}{c_0}\left(\sqrt{(x_{antenna,j} - x_{playera,n})^2 + (y_{antenna,j} - y_{playera,n})^2 + (z_{antenna,j} - z_{playera,n})^2} - \sqrt{(x_{antenna,k} - x_{palyera,n})^2 + (y_{antenna,k} - y_{playera,n})^2 + (z_{antenna,k} - z_{playera,n})^2}\right)$$

The calculation of ΔTOA removes jitter, drift, etc. of the mobile transceiver clock from the calculation of location. The above equation for TOA, along with transmission of PRN codes by the at least three spread spectrum transceivers can be used to determine TOA errors caused by the lack of $$\begin{bmatrix} x_{1j} \\ x_{2j} \\ x_{3j} \end{bmatrix} = T(TOA_{i,j}) \text{ for } i = 1, \ldots, n \text{ beacon antennae}$$

and $j$ = the $m^{th}$ track object where T is the transform operator that uniquely solves the set of simultaneous inequalities describing the ΔTOA measurements between all unique antenna pairings. These equations can be solved in closed form after linearization. The accuracy of the position estimates can be improved by taking multiple measurements and using least squares estimation and weighting techniques. Also, estimates of previous ΔTOAs may be used to improve accuracy by techniques known in the art.

An additional indicator of the object's position can be derived from the signal levels received by the tower transceivers 12. As the object patches 16 move away from the tower transceivers 12, the signal level received by the tower transceivers 12 will drop approximately proportional to the square root of distance between the tower transceivers 12 and the object patches 16. Errors in the square root dependence can be compensated for mathematically.

If the transmitted power is known or can be inferred, the signal levels received by the tower transceivers 12 are an indication of the object's position. Alternatively, if the transmitted power is not known and if the object patch antennas 18 are omni-directional, positional data can be obtained from constant delta signal level curves derived from the difference in signal levels received by all possible pairings of tower transceiver antennas 14. For directional antennas, the above techniques along with knowledge of the antenna pattern is used to determine the positional data.

The information processor 24 may also determine acceleration and rotation from sensor data. A second information processor 24' processes the position information determined by information processor 24 into location, velocity, and acceleration (LVA) estimates for the objects. The second information processor 24' implement various adaptive digital filters employing Kalman techniques.

The central processor 22 also includes an application processor 28 that processes the LVA estimates and presents them to the user along with data from an object database. In one embodiment, the application processor 28 is configurable in real time ("on-the-fly") so that the presentation to the user of the LVA estimates and the data from an object database can be modified on demand. The application processor 28 also identifies maneuvers (i.e. specific plays in a game such as football) and object birth and death events such as a player coming onto or leaving a playing field. Maneuver identification is used to dynamically reconfigure the system and optimally assign processing resources. The central processor 22 may also include a database engine for storing and retrieving information about the objects.

From the LVA estimates, one skilled in the art can calculate various application specific metrics. These metrics include impact, total distance/gained distance, quickness, average speed around bases, and vertical leap. The results from calculating the metrics can be presented to the user in numerous ways. For example, the metrics may be presented as numerical data, graphical data, light intensity, color, physical force or sound.

The present invention has certain advantages over prior art GPS based systems. For example, the present invention can obtain centimeter accuracy at video update rates and, therefore, is significantly more accurate than GPS based systems. Also, the present invention can be used indoors and can work in urban canyon environments. In addition, the present invention is suitable for real time video because it has a relatively fast data acquisition rate (30 Hz). Moreover, the present invention also does not require a very precise clock.

Although the present invention was described with many examples in sporting applications, the present invention is useful for numerous other applications. For example, the present invention is useful for tracking any type of asset. The present invention can be used for locating people or materials moving within a facility. The present invention is also useful for collision avoidance systems and automated vehicle systems. The present invention also has numerous military application such as landing vehicles and gathering data on troop movements and performance for later analysis.

The present invention also is useful for photography and cinematography. The present invention can be used for auto-focus and auto-tracking cameras. The present invention can also be used for collecting three-dimensional positional data for special effects.

In addition, the present invention is useful for virtual reality applications such as tracking player motions, game balls, or vehicles. The present invention may be used for merging motion data with game data so that an observer can appear to be playing in a game or actively affecting the game. For example, motion data of players in a game such as football, hockey, basketball, baseball can be merged with game data such as a map of the playing field and displayed on a video display terminal so that an observer of the video display terminal appears to be in the game. In one embodiment, motion data and game data are distributed over the internet so any number of observers can appear to be in the game. Motion data can take numerous forms. For example, an observer may observe motion data visually or may observe motion data as a force or a sound. The game interaction can be either or both of the real game on the player or the player on the real game.

In addition, although some aspects of the present invention were described with particular position location techniques, the invention may be practiced with other position location systems. For example, other position locating techniques such as radar, satellite imagery, astronomical observations, GPS, accelerometers, video processing, laser reflectometry, directional antennas, moving antennas, and steerable antenna arrays may be used with this invention.

Equivalents

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. An RF tracking system for determining characteristics of at least one object in a local area, the system comprising:

(a) at least one remote spread spectrum radio transceiver, the at least one remote spread spectrum radio transceiver being coupled to the at least one object in the local area;

(b) at least three tower spread spectrum radio transceivers being positioned proximate to the local area and the at least three spread spectrum radio transceivers transmitting signals to and receiving signals from the at least one remote spread spectrum radio transceiver;

(c) a signal processor coupled to the at least three tower spread spectrum radio transceivers, the signal processor processing signal data received from the at least three tower spread spectrum radio transceivers;

(d) a database engine in communication with the signal processor, the database engine storing in and retrieving from a database the signal data and biographical data relating to the at least one object; and (e) a processor coupled to the database engine, the processor determining the characteristics of the at least one object based, at least in part, on the signal data and the biographical data.

2. The RF positioning system of claim 1 further comprising a video processor for displaying the characteristics of the at least one object.

3. The RF positioning system of claim 1 wherein the database engine stores the signal data received by the at least three tower spread spectrum radio transceivers in real time.

4. The RF positioning system of claim 1 further comprising at least one processor that is electrically coupled to the at least three tower spread spectrum radio transceivers, the at least one processor determining the time of arrival of signals received by the at least three tower spread spectrum radio transceivers.

5. The RF positioning system of claim 1 wherein the characteristics include at least one of identity, position, velocity, acceleration, jerk, orientation, rotational velocity, rotational acceleration, and rotational jerk of the objects.

6. The RF positioning system of claim 1 wherein the signal processor is connected to the at least three tower spread spectrum radio transceivers by a network.

7. The RF positioning system of claim 1 further comprising an object signal processor coupled to the at least one remote spread spectrum radio transceiver.

8. The system of claim 1, wherein biographical data comprises height, weight, strength metrics, speed metrics and previous game statistics.

9. A method for determining characteristics of at least one object in a three-dimensional space, the method comprising:

(a) providing at least one remote spread spectrum radio transceivers, the at least one remote spread spectrum radio transceiver being coupled to the at least one object;

(b) positioning at least three tower spread spectrum radio transceivers proximate to the three-dimensional space;

(c) receiving signal data from the at least one remote spread spectrum radio transceiver with the at least three tower spread spectrum radio transceivers;

(d) coupling a signal processor to the at least three tower spread spectrum radio transceivers, the signal processor processing the signal data received from that at least three tower spread spectrum radio transceivers;

(e) storing in and retrieving from a database the signal data and biographical data relating to the at least one object; and (f) processing at least the signal data and the biographical data to determine the characteristics of the at least one object.

10. The method of claim 9 wherein the step of processing the signal data comprises calculating times of arrival of the signal data at each of the at least three tower spread spectrum radio transceivers.

11. The method of claim 10 wherein the times of arrival are measured relative to a synchronization clock.

12. The method of claim 9 wherein the characteristics comprise at least one of identity position, velocity, acceleration, jerk, orientation, rotational velocity, rotational acceleration and rotational jerk.

13. The method of claim 9 wherein the step of storing the signal data and the biographical data in the database is performed in real time.

14. The method of claim 9 further comprising the step of displaying the characteristics of the at least one object on a video screen.

15. The method of claim 14 further comprising the step of displaying the biographical data of the at least one object on the video screen.

16. The method of claim 9 further comprising the step of transmitting the characteristics of the at least one object over an internet.

17. The method of claim 9 further comprising instructing the at least three tower spread spectrum radio transceivers to transmit a spread spectrum signal that instructs the at least one remote spread spectrum radio transceiver to transmit telemetry data or to reconfigure operation.

18. The method of claim 9 wherein the step of processing the signal data includes correcting for time-of-arrival errors caused by the least three tower spread spectrum radio transceivers being unsynchronized.

19. The system of claim 9, wherein biographical data comprises height, weight, strength metrics, speed metrics and previous game statistics.

20. A system for monitoring the performance of at least one sports player on a sporting field, the system comprising:

(a) at least one remote spread spectrum radio transceiver, the at least one remote spread spectrum radio transceiver being positioned on the at least one sports player;

(b) at least three tower spread spectrum radio transceivers being positioned proximate to the sports field, the at least three tower spread spectrum radio transceivers transmitting signal data to and receiving signal data from the plurality of remote spread spectrum radio transceivers;

(c) a signal processor coupled to the at least three tower spread spectrum radio transceivers, the signal processor processing signal data received from the at least three tower spread spectrum radio transceivers;

(d) a database engine in communication with the signal processor, the database engine storing in and retrieving from a database the signal data and biographical data of the at least one sports player; and (e) a processor coupled to the database engine, the processor determining the characteristics of the at least one sports player based, at least in part, on the signal data and the biographical data.

21. The system of claim 20 wherein the characteristics include at least one of identity, position, velocity, acceleration, jerk, rotational velocity, rotational acceleration, and rotational jerk.

22. The system of claim 20 further comprising a video processor for displaying the characteristics of the at least one sports player.

23. The system of claim 20 further comprising a tactile feedback apparatus for displaying the characteristics of the at least one sports player.

24. The system of claim 20 further comprising a sound system for communicating the characteristics of the at least one sports player.

25. The system of claim 20 further comprising a data processor for calculating player performance metrics and statistics for the at least one sports player.

26. The system of claim 20 further comprising at l east one sensor positioned on the at least one sports player, the sensor being electrically coupled to the at least one remote spread spectrum radio transceiver.

27. The system of claim 26 wherein the at least one sensor comprises at least one of impact, acceleration, or gyro sensors.

28. The system of claim 20, wherein biographical data comprises height, weight, strength metrics, speed metrics and previous game statistics.

* * * * *